United States Patent [19]

Naples et al.

[11] Patent Number: 4,970,758

[45] Date of Patent: Nov. 20, 1990

[54] STUFFING METHOD AND APPARATUS

[75] Inventors: Daniel F. Naples, Tinley Park; George O. Pehr, Orland Park; Vytas A. Raudys, Chicago, all of Ill.

[73] Assignee: Viskase Corporation, Chidage, Ill.

[21] Appl. No.: 463,768

[22] Filed: Jan. 12, 1990

[51] Int. Cl.⁵ .............................................. A22C 21/00
[52] U.S. Cl. ........................................ 452/38; 452/37
[58] Field of Search .................. 17/49, 35, 33, 34, 41, 17/42, 1 F

[56] References Cited

U.S. PATENT DOCUMENTS

| Re. 30,390 | 9/1980 | Kupcikevicius et al. | 17/49 |
| 4,044,426 | 8/1977 | Kupcikevicius et al. | 17/49 |
| 4,077,090 | 3/1978 | Frey et al. | 17/41 |
| 4,558,488 | 12/1985 | Martinek | 17/41 |
| 4,766,645 | 8/1988 | Lamartino et al. | 17/49 |
| 4,773,128 | 9/1988 | Stanley et al. | 17/49 |

Primary Examiner—Willis Little
Attorney, Agent, or Firm—Roger Aceto

[57] ABSTRACT

A stuffing method and apparatus is disclosed which produces a stuffed log having a front end portion which is larger in diameter than the remainder of the log. This is accomplished by spacing the sizing disc and pressure ring apart when food product is first introduced into the casing and the immediately pressing the sizing disc and pressure ring together while stuffing the front end portion of the casing and then moving the sizing disc and pressure ring to a set predetermined distance apart and holding them in this position while stuffing the remainder of the product.

12 Claims, 4 Drawing Sheets

STUFFING METHOD AND APPARATUS

TECHNICAL FIELD

The present invention relates to method and apparatus for stuffing food products into sausage casing. More particularly, the present invention relates to method and apparatus for stuffing the leading or first-stuffed end portion of the product to a larger diameter than the remainder of the product.

BACKGROUND OF THE INVENTION

In sausage production, a finely divided meat composition, commonly referred to as an emulsion, is stuffed into a tubular casing. For automatic operation, these tubular casings are utilized in shirred lengths known to persons familiar with the art as "sticks". After a stick is loaded onto the stuffing machine it is intended that the stuffing machine run continuously until the casing supply is exhausted. In this fashion, a plurality of stuffed products or "logs" are produced from the casing in each shirred stick. The length of each log may vary from 2 to 6 feet or more. The stuffed log is then cooked or cured by well known processes to produce a processed sausage meat for consumption.

For aesthetic, economic and quality control considerations, it is desirable for the processed log to have a substantially uniform diameter over its entire length.

For example, a substantially uniform diameter is especially desired for the production of stuffed products which are subsequently sliced and prepackaged for retail sales. Machines which slice these products usually are set up to cut a predetermined number of slices for each package, but at retail the packages are sold on a weight basis. Accordingly, it is important to have a substantially uniform diameter so that the predetermined slice count will consistently produce packages of substantially the same weight. To achieve a desired processed diameter when using a cellulosic casing, it is customary to stuff to a "green" or unprocessed diameter slightly larger than the desired processed diameter to accommodate for shrinkage which occurs during processing.

Stuffing machines for producing logs of substantially constant diameter are well known. For example in U.S. Pat. No. Re. 30,390, a stuffing machine is disclosed which uses a sizing disc within the casing to circumferentially stretch the casing just prior to stuffing. This circumferential stretch exerts a drag or "holdback" on the casing. This drag (sometimes referred to herein as "holdback") resists the forward movement of the casing as a food product is introduced under pressure into the casing. This insures that the casing stuffs out to the full diameter recommended by the casing manufacturer.

Due to casing manufacturing tolerances, the diameter of a casing may vary slightly along its length. To some extent, the sizing disc as disclosed in U.S. Pat. No. Re. 30,390 compensates for this variation in casing diameter so the filled diameter is substantially constant. For example, if the casing diameter decreases, the holdback or drag force increases as the narrowed section of casing passes over the fixed circumference of the sizing disc. The increased drag slows the passage of casing so its stuffed diameter increases. Conversely, if the casing diameter increases, the casing passes more freely over the disc so the stuffed diameter decreases. The result is a stuffed product having a substantially constant diameter. In order to obtain this effect, the diameter of the sizing disc should be the same as the recommended stuffed diameter of the casing. Thus, in use, a sizing disc of a given size only is used with one size of casing.

When using a sizing disc, stuffed diameter is further controlled by positioning a pressure ring adjacent the sizing disc as disclosed in U.S. Pat. No. 4,077,090. The pressure ring is disposed on the outside of the casing so the casing passes first over the sizing disc and then inward through the pressure ring. Changing the longitudinal distance between the sizing disc and pressure ring is a known way of adjusting the drag on the casing. For example, U.S. Pat. No. 4,766,645 discloses a stuffing machine having sensors which monitor the diameter of the casing as it is stuffed. These sensors are capable of generating feedback signals for automatically adjusting the longitudinal distance between the sizing disc and pressure ring to adjust the holdback on the casing as needed to maintain a desired stuffed diameter.

One problem which has been experienced during the processing of a green log is that the first-stuffed leading end portion of the green log tends to undergo a larger diameter reduction than the rest of the log. Thus, even though the green log is stuffed to a uniform diameter over substantially its full length, the leading end portion of stuffed length after processing will have a smaller diameter than the remainder of the processed log. This is sometimes referred to as "front-end slump" and effects about the first 2-8 inches of stuffed length. Front-end slump is particularly troubling when making a log for slicing. This is because with front-end slump, a greater number of slices must be discarded as undersize compared to a processed log of uniform diameter over substantially its entire length.

For example, it generally is appreciated that a green log about 4.5 inches in diameter comprising a high quality meat emulsion as is used for bologna, will shrink diametrically about 2% during processing. This is about 0.1 inch for the green log 4.5 inches in diameter. However, shrinkage of the leading or first end portion of the log is closer to 4% or 0.2 inch for the same green diameter of 4.5 inches.

One method proposed to insure a uniform diameter over substantially the entire length of the processed log, is to over stuff the front end portion of the green log to compensate for the greater shrinkage during processing.

However, the increased drag required to over stuff the leading end of a stuffed product may present problems. For example, if the drag is too great at the onset of stuffing the casing may break under the strain. It also is possible for the closure at, the leading end to fail resulting in what is referred to as a "blown end". These problems are particularly acute when the appropriate drag is produced by positioning the sizing disc and pressure ring one against the other so the casing is pinched therebetween. If the casing is pinched between the sizing disc and pressure ring at the onset of stuffing, maximum strain is produced on the casing and closure due to the high static friction which must be overcome to start the casing moving between the pressed together sizing disc and pressure ring.

Accordingly, it is an object of the present invention to provide a stuffing method and apparatus for producing a stuffed log having a leading, first-stuffed end portion which is larger in diameter than the remaining portion of the log.

Another object of the present invention is to provide a stuffing method and apparatus which exerts a higher drag force on the casing while stuffing a leading end portion of the log and then lowers drag for stuffing the remainder of the log.

Still another object of the invention is to provide a stuffing method and apparatus which applies a lower drag force on the casing at the onset of stuffing and then immediately increases the drag force to a higher level for stuffing a leading end portion of the casing

SUMMARY

The method of the present invention may be characterized by the steps of:

(a) passing the casing longitudinally along a stuffing horn between longitudinally spaced inner and outer drag members, said inner drag member bearing on the inside surface of the casing and said outer drag member bearing on the outside surface of the casing, and the longitudinal distance between said drag members being variable to change the drag on the casing during stuffing;

(b) commencing the introduction of food product for stuffing the casing with said drag members spaced longitudinally one from the other;

(c) immediately after commencing stuffing, longitudinally moving at least one of said drag members towards the other and pressing them together so as to pinch the casing therebetween and thereby imposing a drag on the casing for stuffing the casing to a diameter larger than a target stuffed product diameter;

(d) continuing stuffing at said larger than target diameter until a first portion of the casing is stuffed; and then (e) establishing a predetermined distance between said drag members to impose a drag on the casing for stuffing the casing to said target stuffed product diameter; and (f) continuing stuffing of the casing while maintaining said drag members at said predetermined distance apart to obtain said target diameter for the remaining length of the stuffed casing.

The apparatus of the present invention may be characterized by:

(a) a frame and a stuffing horn on said frame;

(b) an inner and an outer drag member arranged along said stuffing horn so as to bear against the inside and outside surfaces respectively of a casing moving along said horn in a stuffing direction;

(c) drive means for moving at least one of said drag members longitudinally towards and away from the other between first spaced apart positions and second positions whereby said members are pressed together and a said casing is pinched between said members, said members at said second position imposing a drag on a said casing sufficient for stuffing the casing to a diameter larger than a desired target stuffed product diameter;

(d) control means operable immediately after commencing the stuffing introduction of a food product into the casing to activate said drive means for moving at least one of said drag members from its first position to said second position and for maintaining said drag members at said second position until a first casing portion is stuffed; and (e) said control means being operable after the stuffing of said first casing portion for locating said drag members at a set predetermined distance apart so as to impose a drag on the casing sufficient to permit stuffing the casing to a desired target stuffed product diameter.

DESCRIPTION OF THE INVENTION

Figure 1:
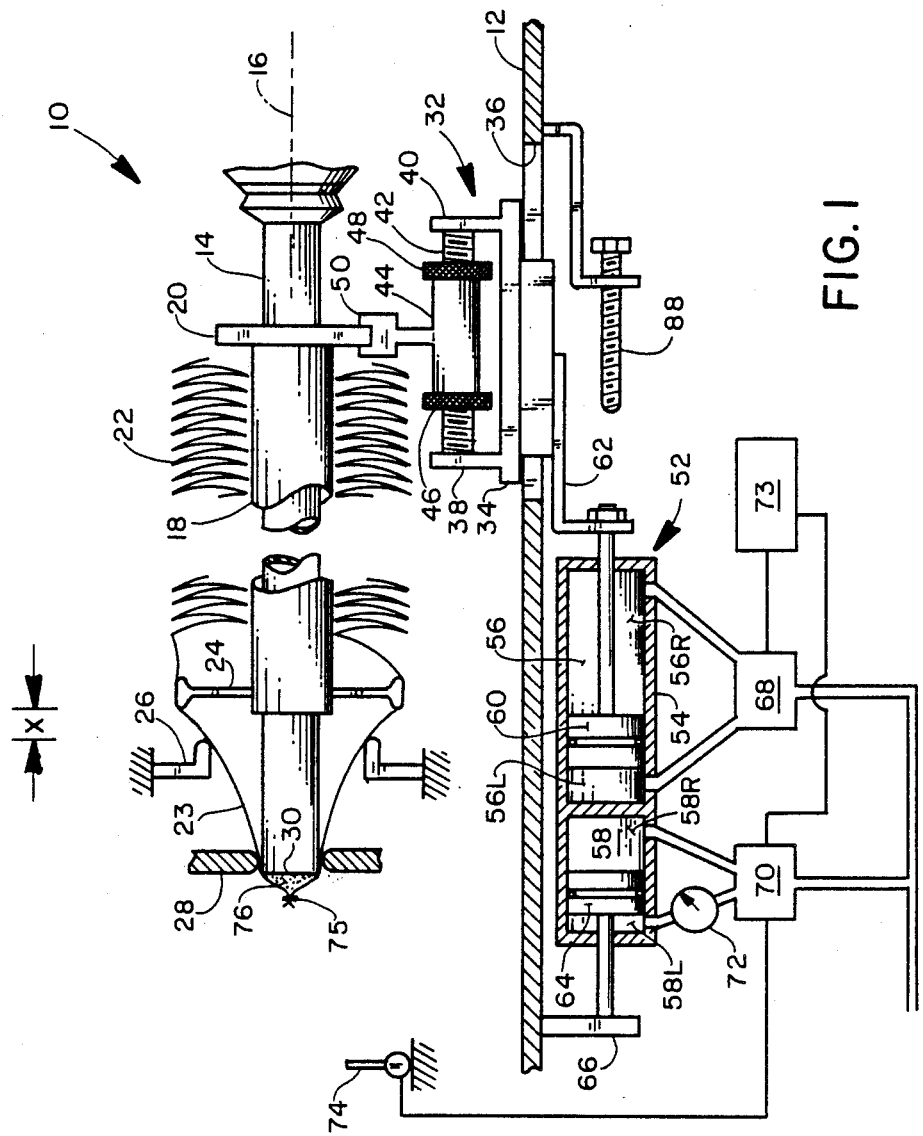
FIGS. 1-5 are elevation views which show an operational sequence of the apparatus of the present invention which may be used to practice the inventive method for controlling the diameter of a stuffed casing.

Referring to the drawings, FIG. 1 shows the stuffing apparatus of the present invention generally indicated at 10. The apparatus has a frame, a portion of which is shown at 12. Supported above the frame is a stuffing horn 14 which is oriented along a longitudinal stuffing axis 16. Slidably disposed about the horn is a sleeve 18. The aft end of the sleeve includes a flange 20 for connection to the machine as set out further hereinbelow.

Carried by the sleeve 18 is a supply of shirred casing 22. Also carried by the sleeve, at its fore end, is a sizing disc 24 which is well known in the art. Briefly, the sizing disc 24 is used to open and unwrinkle the casing 23 which deshirrs from the shirred casing 22 and/or to circumferentially stretch the casing prior to stuffing. It is preferred to provide the sleeve 18, shirred casing 22 and sizing disc 24 as a unitary shirred casing article. Such an article is disclosed, for example, in U.S. Pat. No. 4,570,292.

The casing 23 which deshirrs over the sizing disc 24 passes through a pressure ring 26. The pressure ring is part of the stuffing machine and generally it is fixed during stuffing. The sleeve 18 (and therefore the disc 24 attached to the sleeve) is movable towards and away from the pressure ring. As mentioned above, this movement is utilized to increase or decrease the drag or holdback on the casing as needed to increase or decrease the stuffed diameter of the casing. In this respect, moving the disc 24 towards the pressure ring 26 will increase the drag and the stuffed diameter, whereas, moving the disc away from the pressure ring will decrease the drag and the stuffed diameter. This action is more fully described in U.S. Pat. Nos. 4,077,090 and 4,164,057.

Also conventional is a seal ring 28 which prevents the food product from back flowing around the discharge end 30 of the stuffing horn. Not shown is a conventional clipper carriage for gathering, closing and severing the casing after a desired length of casing is stuffed.

A conventional slacker and size adjustment mechanism (hereinafter referred to as the "slacker") is shown at 32. The slacker is operable to reciprocate sleeve 18 on the horn at appropriate times in the stuffing cycle in order to provide the slack casing needed for gathering and closing around the ends of a stuffed product. In this respect, the slacker includes a slide 34 which is guided by a slot 36 in the frame 12. The slide has upstanding end pieces 38, 40 which support the ends of a threaded shaft 42. A bushing 44 is carried by the shaft between two threaded lock nuts 46, 48. Any suitable means such as a clamp 50 is used to attach the bushing 44 to the sleeve flange 20.

The drive for the slacker 32 is a pneumatic system generally indicated at 52. The drive 52 is formed by connecting two pneumatic cylinders back-to-back. This construction is represented schematically in the figures by a single pneumatic cylinder 54 having two separate chambers 56, 58. A piston 60 in chamber 56 is operably connected to the slide 34 by means of a bracket 62 whereas a piston 64 in chamber 58 is anchored to frame 12 of the apparatus by a bracket 66.

Valves 68, 70 control the pressurization of chambers 56, 58 respectively by directing air to one end or the other of each chamber. A pressure regulator 72 in line with valve 70 is manually adjustable to control the air pressure applied to the left hand side 58L of chamber 58.

The timing of the operation of valves 68, 70 is controlled by the machine control system of the stuffing apparatus shown at 73. The operation of valve 70 also is controlled by a limit switch 74. This limit switch is positioned so as to contact the leading end of a stuffed log at some predetermined distance from the stuffing horn discharge end 30.

FIG. 1 shows one position of all components at the onset of stuffing. In particular, the right hand side 56R, 58R of each chamber 56, 58 (as viewed in FIG. 1) is pressurized. This locates the sizing disc 24 a set distance "x" from pressure ring 26. This distance is selected to provide the drag needed to stuff the casing to a target green diameter and is set by adjusting the threaded lock nuts 46, 48 along threaded shaft 42.

To start the stuffing operation, the machine control system 73 signals a food pump (not shown) to begin operation. This forces food under pressure through stuffing horn 14 and into the casing 23 which is closed in front of the stuffing horn discharge end 30. As this closed end begins to fill with the food product 76, the static friction between the casing and the sizing disc/pressure ring is overcome and the casing begins to draw forward from the shirred casing supply 22 and along the stuffing axis.

The timing sequence is such that immediately after stuffing begins, the machine control system 73 causes valve 70 to switch so the left hand side 58L of chamber 58 is pressurized. Since piston 64 is anchored to frame 12, pressurizing the left hand side of chamber 58 causes the cylinder 54 to move to the left to the position shown in FIG. 2. Since the pressurization of chamber 56 does not change, piston 60 and the slacker 32 are also carried to the left. This causes the sizing disc 24 to press against the pressure ring 26 thereby squeezing the casing 23 between these components. This squeezing action increases the drag on the casing so the casing stuffs to a diameter larger than the target diameter. Moreover, the increase over the target diameter can be set to a desired level by adjusting the pressure regulator 72 to increase or decrease the air pressure applied to the left side 58L of chamber 58. For example, increasing the air pressure will force the sizing disc to press harder against the pressure ring thereby increasing drag on the casing. Conversely, by decreasing the air pressure the force of the sizing disc pressing against the pressure ring is decreased and the drag on the casing is reduced.

In any event, it is important to note that the squeezing of the casing in this fashion occurs after the casing has begun to move. Consequently, the casing does not have to overcome static friction which otherwise would exist between the pressed together sizing disc/pressure ring and the casing. If the sizing disc and pressure ring are pressed together when the casing begins to move between them, the resulting static friction may retard the movement of the casing to such an extent that the stuffing pressure will cause the casing to break or will cause a failure of the closure 75 at the end of the casing.

Figure 3:
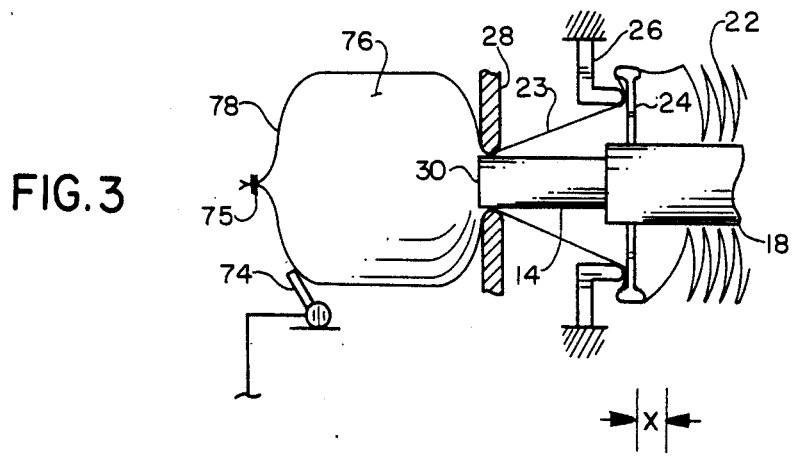

Stuffing the casing to a diameter larger than the target green diameter continues in this fashion until the leading end 78 of the log trips switch 74 (FIG. 3) which preferably is located between about 2 to 8 inches from the stuffing horn discharge end 30. Tripping the limit switch causes valve 70 to pressurize the right side 58R of chamber 58 which moves cylinder 54 and the slacker 32 back to the position shown in FIG. 1. This immediately repositions the sizing disc at the set distance "x" for stuffing the casing to the target green diameter.

Figure 4:
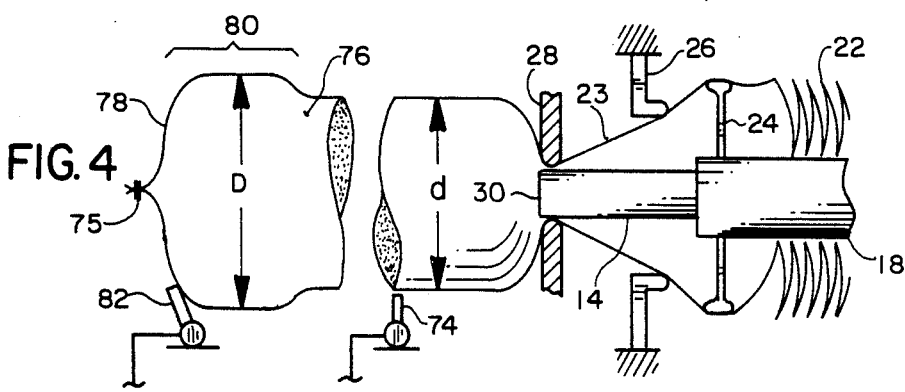

As shown in FIG. 4, stuffing continues with the sizing disc 24 at the set distance "x" from the pressure ring 26 to produce the target green diameter "d" for the remainder of the log. The result is a log which has a leading end portion 80 that is larger in diameter (diameter "D") than the target green diameter "d" of the remainder of the log. The enlarged end portion 80 may be as long as desired but preferably is not more than about 8 inches of the total log length of 2-6 feet or more.

Figure 5:
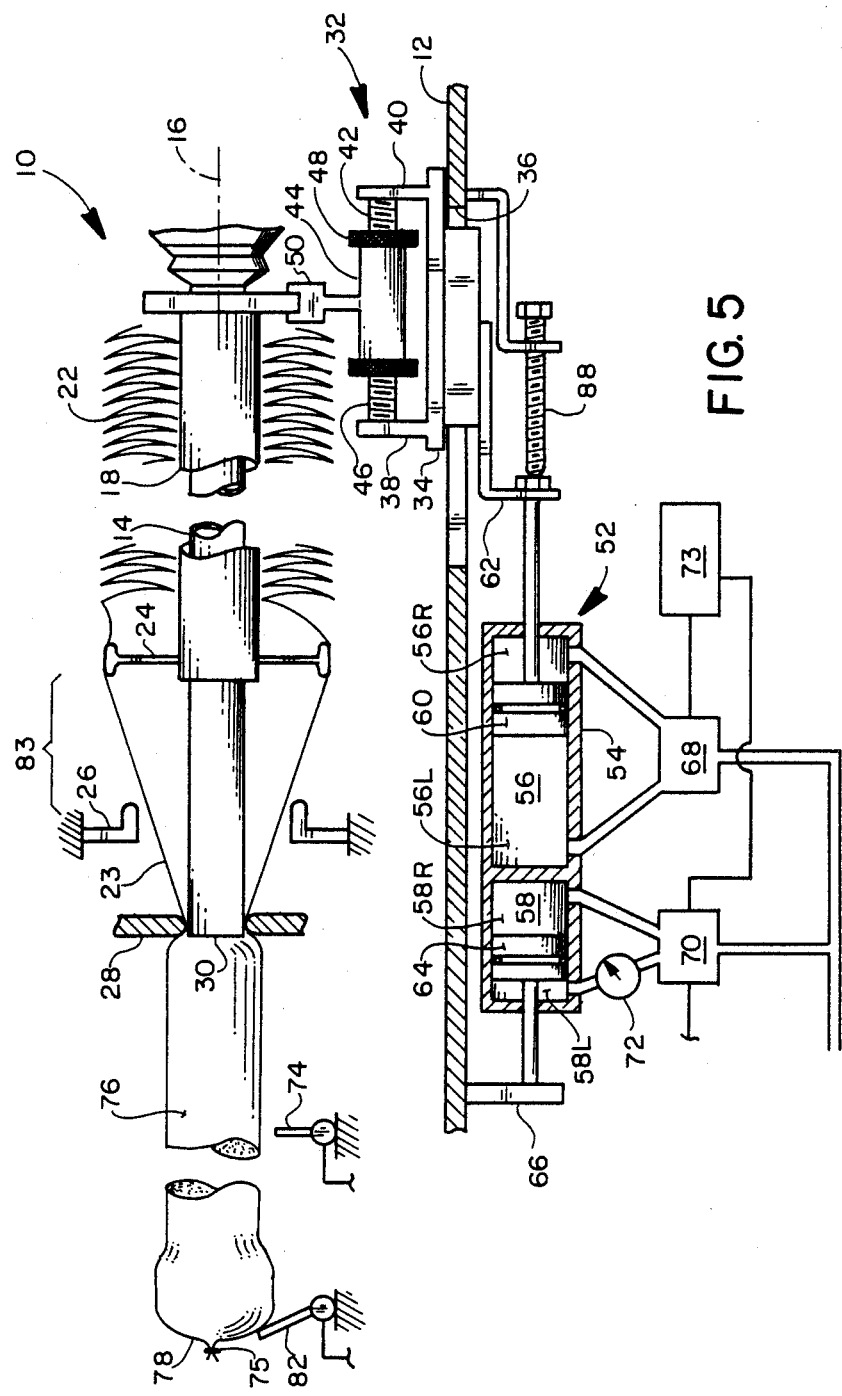

Stuffing continues until a log of a desired length is produced. When this length is reached, the leading end 78 of the log will trip a second limit switch 82. This will terminate the stuffing operation and start the sequence for forming and closing the trailing end of the log. This sequence is conventional and reference is made to U.S. Pat. No. Re. 30,390 (the disclosure of which is incorporated herein by reference) for a more detailed description. For purposes of the present invention, it is sufficient to say that the sequence for forming and closing the end of the log includes providing an amount of slack casing as needed for gathering around and forming the closed trailing end. For this purpose the machine control 73 as shown in FIG. 5 signals valve 68 to pressurize the left side 56L of chamber 56. This forces the piston 60 and the attached slacker 32 to the right as viewed in the figures. The distance moved by the piston 60 and slacker 38 is set by an adjustable stop 88.

As shown in FIG. 5, movement of the slacker 32 drives the sleeve 18 to the right so that a length of casing 83 is drawn over the sizing disc. Valve 68 is then switched to pressurize the right side 56R of chamber 56 so the sleeve 18 returns to the position shown in FIG. 1. This slacks the length of casing 83 so it is easily gathered around the trailing end of the log, closed and then severed in a conventional manner as disclosed in the aforementioned U.S. Pat. No. Re. 30,390.

Figure 6A:
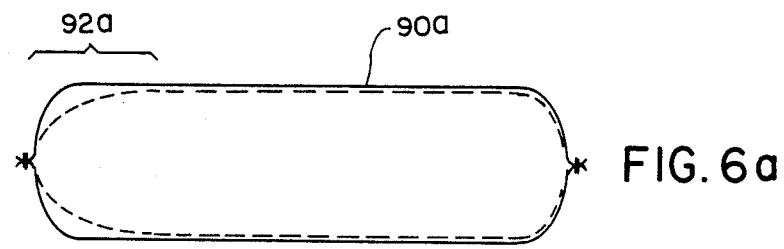
FIG. 6A depicts a log produced by a conventional stuffing method and illustrates the shrinkage on processing.

As noted hereinabove, it is not unusual for a 4.5 inch diameter green log stuffed with a high quality bologna emulsion to shrink about 2% or about 0.1 inch in diameter during processing. Emulsions of lower quality (higher moisture content) may experience a higher shrink rate. Moreover, the leading end portion (about the first 2-8 inches of stuffed product) of the same log may shrink about 4% or 0.2 inch in diameter. This effect is shown in FIG. 6A. This Figure shows a stuffed log 90a wherein the solid line represents the green log diameter and the dotted line is the diameter of the processed log. The portion effected by the front-end slump problem is shown at 92a. The present invention is able to increase the stuffed diameter of the leading end portion of a green log by 2% thereby offsetting the shrinkage expected at the front end during processing.

Figure 6B:
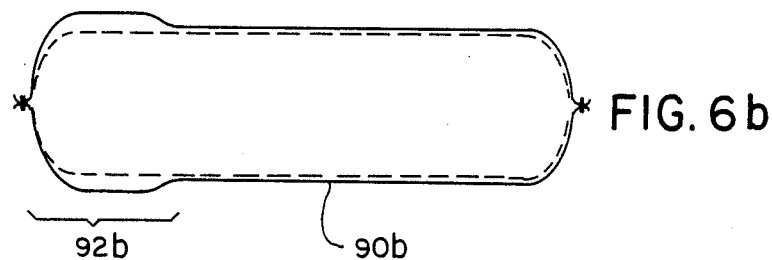
FIG. 6B is a view similar to FIG. 6A but showing a log produced according to the method and apparatus of the present invention.

Thus if the front end portion of a 4.5 in. diameter log is overstuffed to about 4.60 in., then the resulting processed log diameter should be about 4.4 in. over substantially its full length. In other words, 4% shrinkage expected due to front-end slump reduces the overstuffed diameter of the front-end portion to about 4.4 in. and the expected 2% shrinkage rate of the remaining portion of the log (stuffed to 4.5 in.) reduces the stuffed diameter also to about 4.4 in. This effect is shown in FIG. 6B. This figure shows a stuffed log 90b wherein the solid line represents the green diameter and the dotted line represents the processed diameter. As shown, the front end portion 92b has been overstuffed to compensate for the front-end slump so that after processing, the log will have a substantially constant diameter over its entire length.

In one test of the invention, a SHIRMATIC ® 600 E-Z Load stuffing machine as manufactured and sold by Viskase Corporation was modified to incorporate a pneumatic system as shown in FIG. 1. The casing used in the test was a Viskase Corporation size 7½ SHIRMATIC casing having a recommended stuffed diameter of 4.54 inches (115 mm). The distance "x" between the pressure ring and sizing disc was predetermined and set initialIY at about 0.5 in. to achieve this target stuffed diameter. A standard bologna emulsion was used in the test for stuffing the casing.

In accordance with the invention, stuffing started with the pressure ring and sizing disc at the set predetermined distance apart. Immediately after the stuffing of the emulsion into the casing began (e.g., a fraction of a second), the sizing disc was pushed against the pressure ring. This position was held until about 6 inches of the log was stuffed and then the sizing disc was returned to the set predetermined distance for stuffing the rest of the log. Thirteen logs each about 36 inches long were stuffed in this fashion.

The pressure as set by regulator 72 (FIG. 1) was increased after several logs were stuffed to demonstrate that the overstuffed diameter could be selected by changing the pressure supplied to the left side 58L of chamber 58. After stuffing, the diameter of each log was measured using a conventional $\pi$ tape. Diameter measurements were taken at 4 inches from the leading end of each log, at the middle (M) of each log (about 18 inches form the leading end) and at about 32 inches from the leading end (i.e., about 4 inches from the trailing or last stuffed end). These measurements and the pressure set at regulator 72 for stuffing the front end portion of each log is recorded in Table I below.

TABLE I

| | | Distance From Leading End | | |
|---|---|---|---|---|
| Piece | Psig. | 4" | M Dia. in inches | 32" |
| 1 | 20 | 4.59 | 4.54 | 4.55 |
| 2 | | 4.60 | 4.55 | 4.55 |
| 3 | | 4.60 | 4.55 | 4.56 |
| 4 | | 4.60 | 4.55 | 4.56 |
| 5 | | 4.59 | 4.55 | 4.56 |
| 6 | 35 | 4.59 | 4.55 | 4.55 |
| 7 | | 4.62 | 4.56 | 4.56 |
| 8 | | 4.61 | 4.55 | 4.55 |
| 9 | | 4.61 | 4.55 | 4.55 |
| 10 | 50 | 4.64 | 4.55 | 4.55 |
| 11 | | 4.64 | 4.55 | 4.56 |
| 12 | | 4.63 | 4.55 | 4.56 |
| 13 | | 4.63 | 4.56 | 4.57 |

Table I shows that increasing the pressure applied to press the sizing disc 24 and pressure ring 26 together resulted in an increase in the stuffed green diameter of the front end portion of the casing. At the highest pressure used (50 psig) the front end portion of each log was stuffed about 0.10 inches over the target diameter of 4.54 inches. However, the diameter of the log at its middle and trailing end was close to the target diameter of 4.54 inches. This shows that after the front-end portion is overstuffed, returning the sizing ring to its set distance from the pressure ring allowed the stuffed diameter to attain the target diameter for the remainder of the log. This is demonstrated by the diameter measurements taken at the middle and at the 32 inch point of each log.

Also, no casing breakage or closure failure was experienced during the test. This demonstrated that the method of stuffing according to the present invention is useful to avoid the possibility of casing failure when attempting to overstuff the leading end portion of the log.

In a preferred embodiment as described, a limit switch 74 is used to determine the length of the casing to be overstuffed. However, it should be appreciated that the machine control 73 could have a timer for this purpose. In this respect, the length of the overstuffed portion would be determined by how long a time is set for continuing the overstuffing.

Also, it should be appreciated that other changes can be made without departing from the spirit and scope of the invention as claimed. For example, two separate cylinders can be used in place of the cylinder 54 shown in the figures. One cylinder mounted on a carriage would function as chamber 56 and piston 60. A second cylinder for driving this carriage would function as chamber 58 and piston 64.

Figure 2:
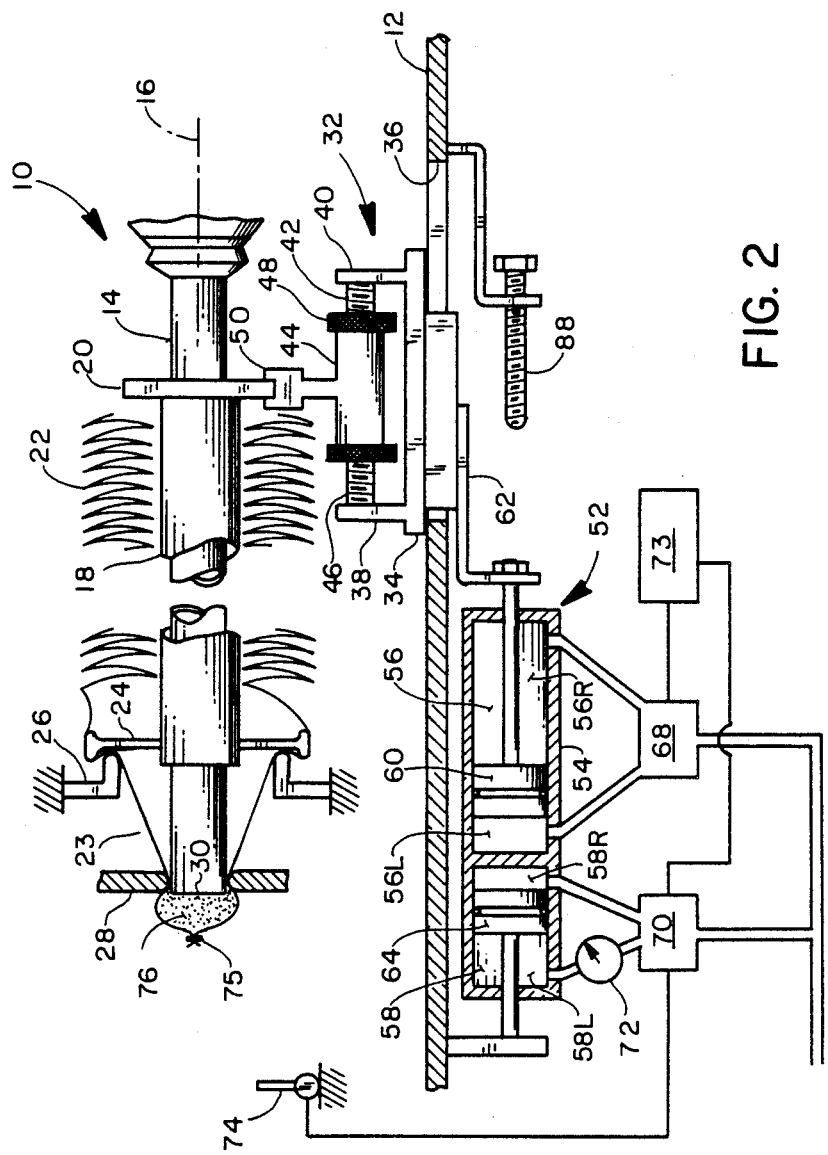

The operational sequence also can be modified. For example, the stuffing operation can begin with the left side 58L of chamber 58 pressurized so the sizing disc 24 is pressed against the pressure ring 26 as shown in FIG. 2. With this arrangement control system 73 first signals valve 68 to pressurize the left side 56L of chamber 56 as if to begin a slacking operation. However, rather than going through a full slacking operation, control system 73 only allows the sleeve 18 (and therefore disc 24) to move a short distance from the pressure ring 26. It then causes pressurization of the right side 56R of chamber 58 so the sizing disc is again pressed against the pressure ring 26 as shown in FIG. 2.

In the interim, control 73 signals the pump (not shown) to begin operation. The result is that the food product begins to flow and the casing 23 begins to move when the sizing disc 24 is spaced from the pressure ring 26. After stuffing starts and the sizing disc 24 is returned to its position pressed against the pressure ring 26, it remains pressed against the pressure ring 26 until the leading end 78 of the product contacts limit switch 74. When this occurs, valve 70 operates to pressurize the right side 58R of chamber 58 which moves cylinder 54 and the slacker 32 to the right as viewed in the figures. This locates the sizing disc 24 the set predetermined distance "x" from the pressure ring so that the remainder of the log is stuffed to the target diameter.

Having described the invention in detail, what is claimed as new is:

1. A method of controlling the diameter of a stuffed casing comprising:
   (a) passing the casing longitudinally along a stuffing horn between longitudinally spaced inner and outer drag members, said inner drag member bearing on the inside surface of the casing and said outer drag member bearing on the outside surface of the casing, and the longitudinal distance between said drag members being variable to change the drag on the casing during stuffing;
(b) commencing the introduction of food product for stuffing the casing with said drag members spaced longitudinally one from the other;
(c) immediately after commencing stuffing, longitudinally moving at least one of said drag members towards the other and pressing them together so as to pinch the casing therebetween and thereby imposing a drag on the casing for stuffing the casing to a diameter larger than a target stuffed product diameter;
(d) continuing stuffing at said larger than target diameter until a first portion of the casing is stuffed; and then
(e) establishing a predetermined distance between said drag members to impose a drag on the casing for stuffing the casing to said target stuffed product diameter; and
(f) continuing stuffing of the casing while maintaining said drag members at said predetermined distance apart to obtain said target diameter for the remaining length of the stuffed casing.

2. A method as in claim 1 comprising:
(a) commencing the introduction of food product for said stuffing with said drag members set at said predetermined distance apart for stuffing the casing to said target diameter;
(b) immediately after commencing stuffing pressing said members together so as to pinch the casing therebetween and thereby stuffing said first portion of casing to a diameter larger than said target diameter; and thereafter
(c) reestablishing said predetermined distance between said drag members thereby restoring the drag on the casing for stuffing it to said target diameter.

3. A method as in claim 1 wherein said moving step (c) comprises moving one of said drag members by pressurized gas.

4. A method as in claim 3 wherein a pneumatic cylinder is operatively connected to one of said drag members and said moving step (c) is accomplished by pressurizing said cylinder.

5. A method as in claim 4 including the step of regulating the pressurizing of said pneumatic cylinder to adjust the force pressing said drag members together.

6. A method as in claim 4 wherein said pneumatic cylinder is operatively connected to said inner drag member for moving it longitudinally with respect to said stuffing horn.

7. Apparatus for controlling the diameter of a stuffed casing comprising:
(a) a frame and a stuffing horn on said frame;
(b) an inner and an outer drag member arranged along said stuffing horn so as to bear against the inside and outside surfaces respectively of a casing moving along said horn in a stuffing direction;
(c) drive means for moving at least one of said drag members longitudinally towards and away from the other between first spaced apart positions and second positions whereby said members are pressed together and a said casing is pinched between said members, said members at said second position imposing a drag on a said casing sufficient for stuffing the casing to a diameter larger than a desired target stuffed product diameter;
(d) control means operable immediately after commencing the stuffing introduction of a food product into the casing to activate said drive means for moving at least one of said drag members from its first position to said second position and for maintaining said drag members at said second position until a first casing portion is stuffed; and
(e) said control means being operable after the stuffing of said first casing portion for locating said drag members at a set predetermined distance apart so as to impose a drag on the casing sufficient to permit stuffing the casing to a desired target stuffed product diameter.

8. Apparatus as in claim 7 comprising means for locating said drag members said set predetermined distance apart and said control means being;
(i) operable to activate said drive means immediately after commencing the stuffing introduction of a food product into the casing for pressing said drag members together, and being;
(ii) operable after the stuffing of said first casing portion to deactivate said drive means and reestablish the set predetermined distance between said drag members.

9. Apparatus as in claim 7 wherein said inner and outer drag members are spaced longitudinally apart in the stuffing direction such that during stuffing the casing contacts said inner drag member and then said outer drag member.

10. Apparatus as in claim 9 wherein said drive means includes a pneumatic cylinder comprising:
(a) a first chamber containing a piston operatively connected to said at least one drag member;
(b) a second chamber containing a piston fixed to said frame; and
(c) means for selectively pressurizing said second chamber to longitudinally move said cylinder and said first piston relative to said stuffing horn.

11. Apparatus as in claim 10 including a regulator valve for adjusting the pressure of air supplied to said second chamber and thereby controlling the force pressing said drag member together.

12. Apparatus as in claim 11 wherein said control means is operable to selectively pressurize said second chamber immediately after commencing the stuffing introduction of food product to move said at least one drag member and press said inner and outer drag members together, and said control means including a sensor positioned longitudinally spaced from said stuffing horn and in the path of stuffed casing passing forward from said stuffing horn, said sensor operating when a stuffed casing reaches said sensor to selectively pressurize said second chamber so as to move said at least one drag member to a position reestablishing said set predetermined distance between said drag members.

* * * * *